United States Patent [19]
Nishigaki

[11] Patent Number: 4,980,757
[45] Date of Patent: Dec. 25, 1990

[54] IMAGE PROCESSING APPARATUS FOR GRADATION PROCESSING OF AN IMAGE SIGNAL TO OUTPUT A PULSE WIDTH MODULATED SIGNAL

[75] Inventor: Yuji Nishigaki, Odawara, Japan
[73] Assignee: Canon Kabushiki Kaisha, Tokyo, Japan
[21] Appl. No.: 425,445
[22] Filed: Oct. 23, 1989
[30] Foreign Application Priority Data
Aug. 20, 1985 [JP] Japan .................. 60-181088
Aug. 20, 1985 [JP] Japan .................. 60-181089
[51] Int. Cl.⁵ .......................... H04N 1/40; H04N 1/46
[52] U.S. Cl. ........................................ 358/75; 358/79
[58] Field of Search ................ 358/75, 75 IJ, 78, 80, 358/283, 298

[56] References Cited
U.S. PATENT DOCUMENTS

| | | | |
|---|---|---|---|
| 3,911,480 | 10/1975 | Brucker | 358/283 |
| 3,916,096 | 10/1975 | Everett et al. | 358/283 |
| 4,040,094 | 8/1977 | Everett et al. | 358/283 |
| 4,149,183 | 4/1979 | Pellar et al. | 358/283 |
| 4,222,643 | 9/1980 | Kitamura et al. | 354/7 |
| 4,232,954 | 11/1980 | Kitamura et al. | 354/7 |
| 4,295,258 | 1/1981 | Holladay | 358/283 |
| 4,387,983 | 6/1983 | Masegi | 358/300 |
| 4,450,453 | 5/1984 | Kitamura et al. | 346/108 |
| 4,507,685 | 3/1985 | Kawamura | 358/283 |
| 4,763,199 | 8/1988 | Suzuki | 358/280 |
| 4,800,442 | 1/1989 | Riseman et al. | 358/298 |
| 4,819,066 | 4/1989 | Miyagi | 355/14 E |

FOREIGN PATENT DOCUMENTS
0204094 12/1986 European Pat. Off. .

OTHER PUBLICATIONS
ALS/AS Logic Circuits Data Book, Texas Instruments, 1983, p. 482.

Primary Examiner—James J. Groody
Assistant Examiner—Mark R. Powell
Attorney, Agent, or Firm—Fitzpatrick, Cella, Harper & Scinto

[57] ABSTRACT

An image processing apparatus utilizes plural image signals, generated with mutually different characteristics, such as screen angle, to modulate plural light beams in order to obtain different colors. Each of the plural image signals is pulse-with modulated respectively with different analog pattern signals to generate the respective plural pulse-with modulated signals in order to modulate the light beam. The analog pattern signals are generated in synchromism with a synchronizing signal associated with the recording beam so as to have, for example, mutually different phases to obtain the mutually different screen angles in the reproduced image formed by the modulated beam. Accordingly, unpleasant moire effects in the reproduced image may be avoided.

37 Claims, 8 Drawing Sheets

FIG. 7A   FIG. 7B   FIG. 7C
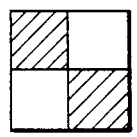 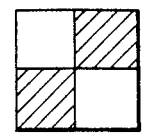 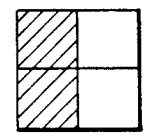
FIG. 8A
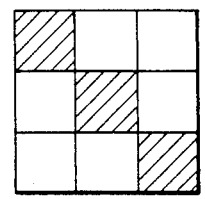
FIG. 8B
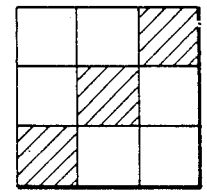
FIG. 8C
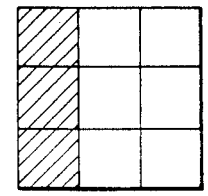

IMAGE PROCESSING APPARATUS FOR GRADATION PROCESSING OF AN IMAGE SIGNAL TO OUTPUT A PULSE WIDTH MODULATED SIGNAL

This application is a continuation of application Ser. No. 06/897,053 filed Aug. 15, 1986, now abandoned.

BACKGROUND OF THE INVENTION

1. Field of the Invention

The present invention relates to an image processing apparatus for obtaining a reproduced image of a high image quality.

2. Related Background Art

In a conventional image processing apparatus for processing color image signals, a full-color reproduction is obtained by processing color image signals corresponding to three colors of yellow (Y), magenta (M) and cyan (C), or four colors further including black (BK). However, the image quality is often significantly deteriorated by a high-frequency moire pattern of a large pitch, eventually inducing unevenness in colors. Such pattern is caused by unevenness in various scanning operations of the printer, in paper feeding, contraction or elongation of paper, or aberration in the timing of different color signals.

SUMMARY OF THE INVENTION

An object of the present invention is to eliminate the above-mentioned drawbacks.

Another object of the present invention is to provide an improvement in the image processing apparatus.

Still another object of the present invention is to provide an image processing apparatus capable of providing a reproduced image of a high resolving power, a satisfactory tonal rendition and a high image quality.

Still another object of the present invention is to provide an image processing apparatus capable of providing a high-quality color reproduced image of a high resolving power and a satisfactory tonal rendition, without unevenness in color.

Still another object of the present invention is to provide an image processing apparatus capable of providing an excellent reproduced image with a simple structure.

Still another object of the present invention is to provide an image processing apparatus capable of providing a reproduced image of a high image quality at a high speed.

Still another object of the present invention is to provide a color image processing apparatus capable of providing an excellent half-tone color reproduced image with a simple structure.

The foregoing and still other objects of the present invention will become fully apparent from the following description, to be taken in conjunction with the attached drawings, and the appended claims.

BRIEF DESCRIPTION OF THE DRAWINGS

FIGS. 7A to 7C are charts showing examples of patterns in case the screen clock signals are two-pixel clocks;

FIGS. 8A to 8C are charts showing examples of patterns in case the screen clock signals are three-pixel clocks;

DETAILED DESCRIPTION OF THE PREFERRED EMBODIMENTS

Now the present invention will be explained in detail by reference to embodiments thereof shown in the attached drawings.

Figure 1:
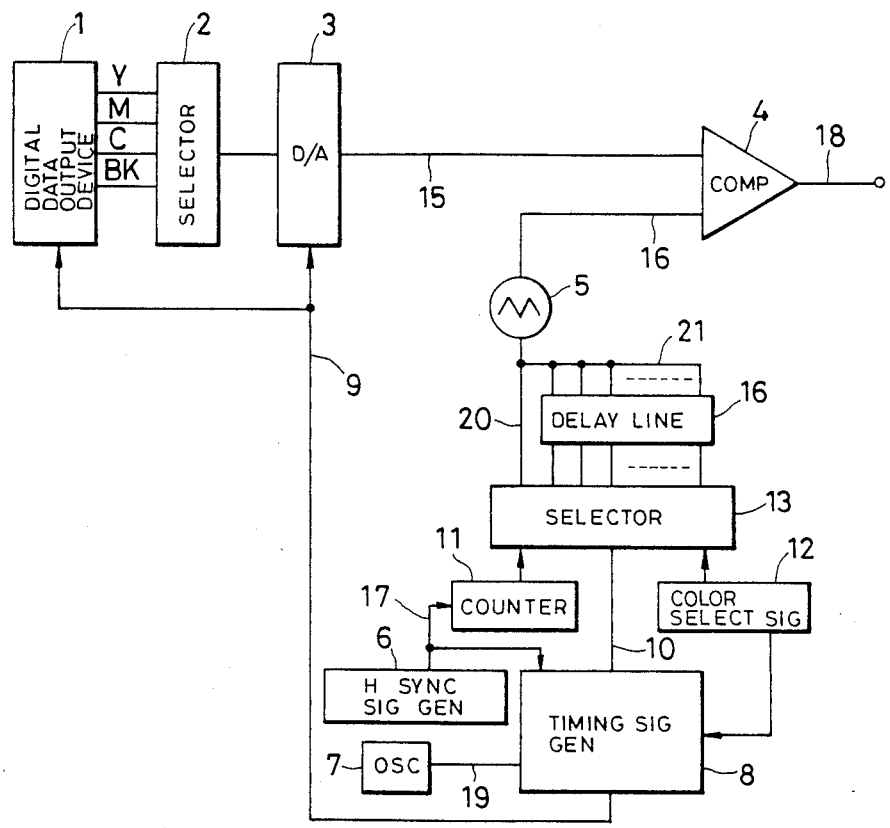
FIG. 1 is a block diagram of an image processing apparatus embodying the present invention.
Figure 2:
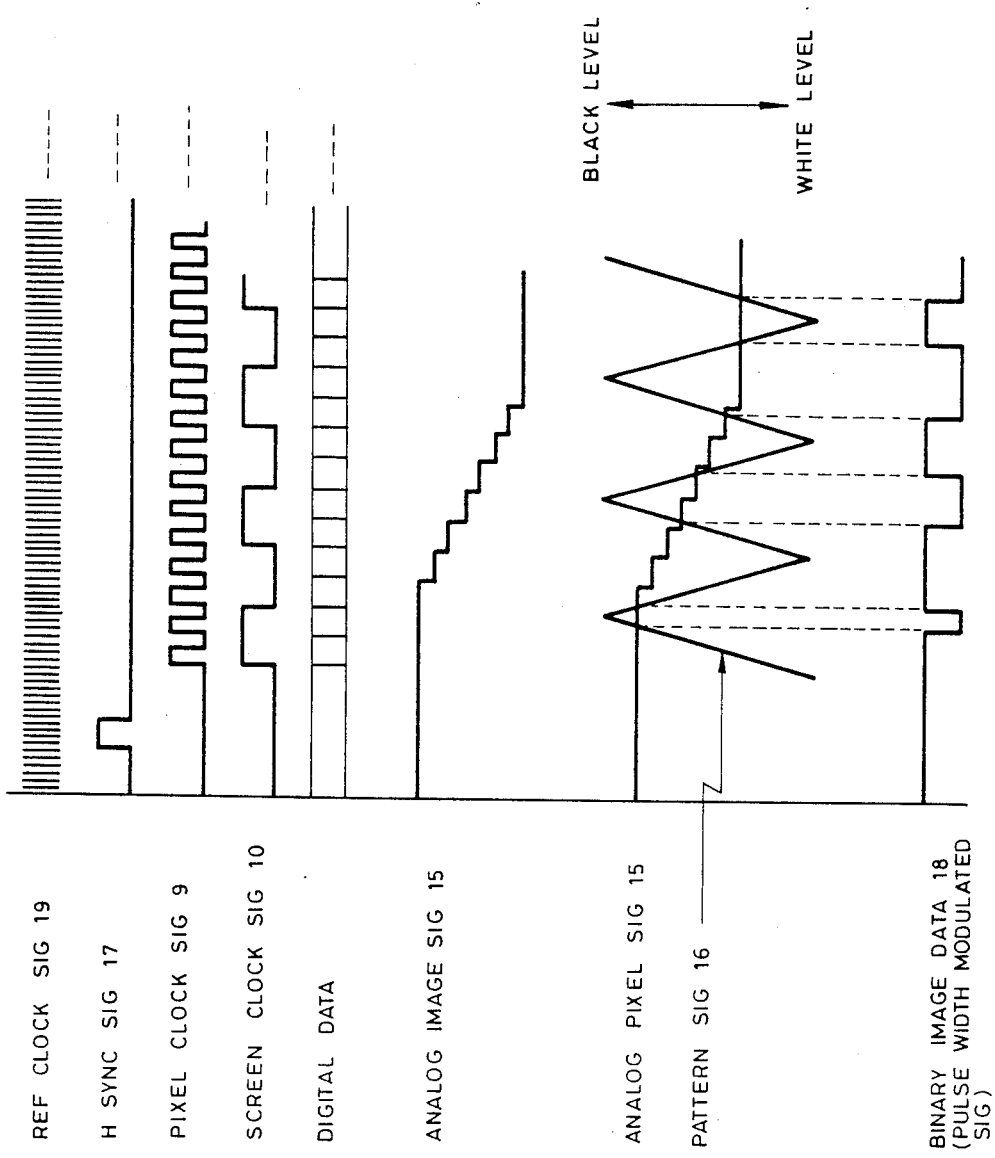
FIG. 2 is a timing chart of various signals in the apparatus shown in FIG. 1.

First reference is made to FIGS. 1 and 2 for explaining the constitution of the image processing apparatus.

FIG. 1 is a block diagram of an image processing apparatus embodying the present invention, wherein a digital data output device 1 performs color conversion and A/D conversion to image data from a CCD color sensor or a video camera, not illustrated in FIG. 1, thereby releasing digital data of different color components, having density information of a predetermined number of bits per pixel. The digital data may also be stored in a memory or may be entered from external equipment through communication.

In case a color printing unit performs printing operation for one color at a time, one of the color component signals Y, M, C and BK is selected by a selector 2 and supplied to a digital-to-analog (D/A) converter 3 for conversion into an analog signal. Thus obtained analog pixel signals 15 are supplied, in succession, to an input terminal of a comparator 4.

A pattern signal generator 5 supplies the other input terminal of the comparator 4 with a pattern signal 6 of triangular shape for every predetermined number of pixels of the digital data released from the digital data output device. An oscillator 7 generates reference clock signals 19. A timing signal generator 8 reduces the frequency of the clock signals 19 from the oscillator 7, for example by ¼, in synchronization with horizontal synchronization signal 17 from a horizontal synchronization signal generator 6, thereby generating pixel clock signals 9 and screen clock signals 10 to be explained later.

The pixel clock signals 9 are used as transfer clock signals for the aforementioned digital data and latch timing signals for the D/A converter 3. As the apparatus of the present embodiment is used in combination with a laser beam printer, the horizontal synchronization signal 17 is a known beam detection signal BD generated for each line of scanning with a laser beam and indicating the scanning position of the beam. The comparator 4 compares the analog-converted pixel signals with the analog pattern signals 16 and generates pulsewidth modulated binary image data 18, which are supplied for example to a modulating circuit for modulating a laser beam. The laser is turned on and off, in response to the output signal of the modulating circuit, according to the duration of pulses of the image data, thereby forming a half-tone image on a recording medium. The above-explained operation is conducted for each of the signals Y, M, C and BK and the obtained images are mutually superposed to obtain a full-color reproduction.

FIG. 2 is a wave form chart showing various signals in the apparatus shown in FIG. 1.

The pixel clock signals 9 are obtained by reducing the frequency of the reference clock signals 19 to ¼ by means of the timing signal generator 8, and are released in synchronization with the horizontal synchronization signals 17. The pixel clock signals 9 are supplied to the D/A converter 3 and the digital data output device 1 and utilized as transfer clock signals for the pixel data. The screen clock signals 10 are obtained by reducing the frequency of the pixel clock signals 9, obtained by the timing signal generator 8, further by the timing signal generator 8, for example to ¼ in the present embodiment. The screen clock signals 10 are utilized as synchronization signals for generating the pattern signals 16, for example of triangular shape, and are supplied to the pattern signal generator 5 through a selector 13 and a signal line 20 without delay.

As shown in FIG. 2, the comparator 4 compares the analog pixel signals 15 with the pattern signals 16 and generates the pulse-width modulated binary image data 18 assuming a level "1" or "0" respectively when the analog pixel signal 15 is larger or smaller than the pattern signal 16.

As explained in the foregoing, the image processing apparatus of the present embodiment is featured by converting the digital image signal into an analog image signal and comparing the analog image signal with a triangular signal of a predetermined frequency, thus achieving substantially continuous pulse-width modulation and obtaining an output image of a high image quality with satisfactory tonal rendition.

Figure 3:
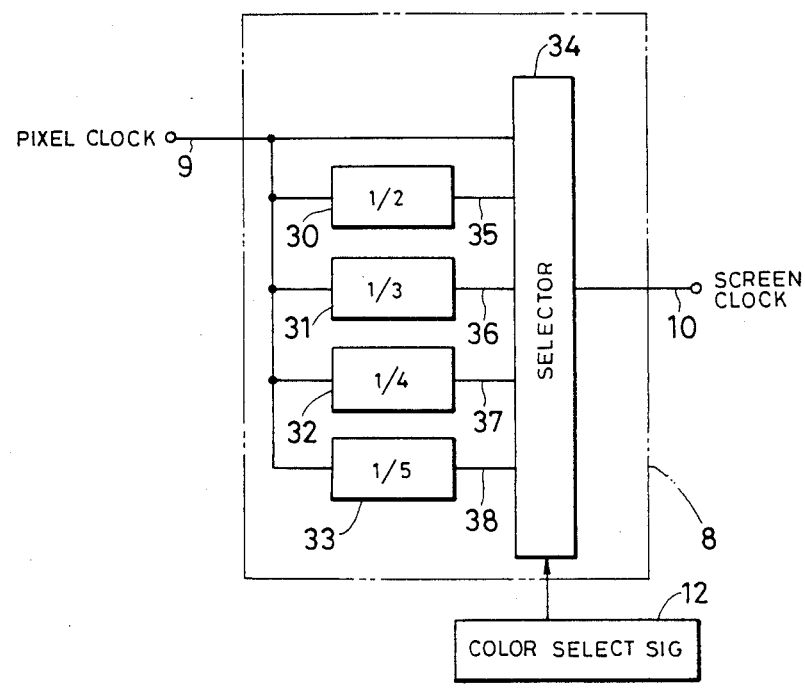
FIG. 3 is a block diagram of a timing signal generating circuit.
Figure 4:
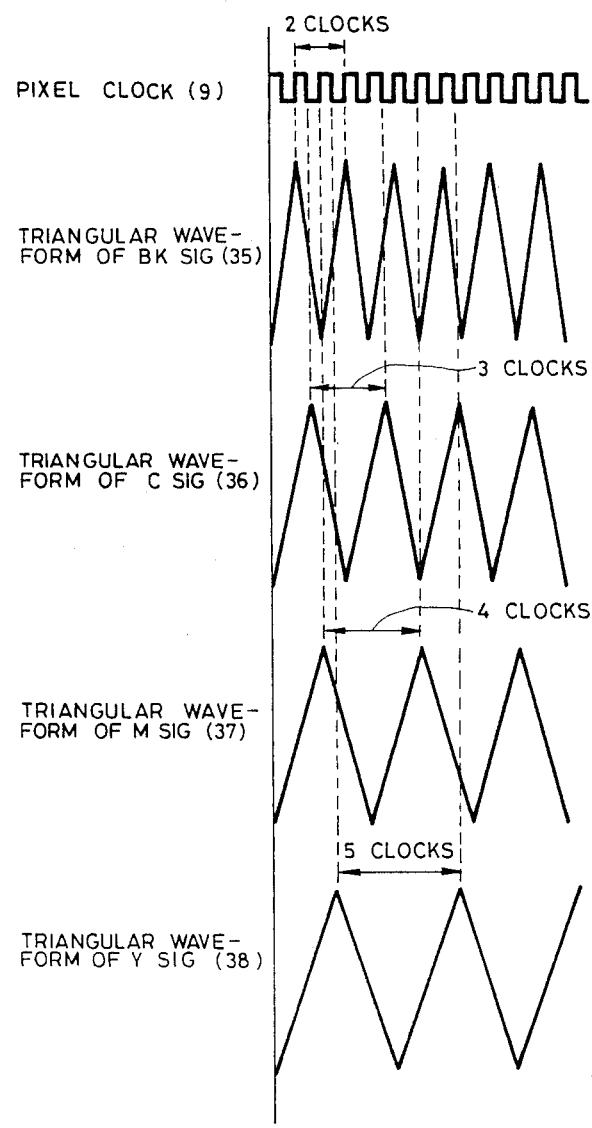
FIG. 4 is a wave form chart showing pattern signals.

Now reference is made to FIGS. 3 and 4 for explaining the timing signal generator.

FIG. 3 is a block diagram of the timing signal generator 8, which can generate color signals of Y, M, C and BK with respectively different screen lines.

The timing signal generator 8 is provided with a ½-frequency dividing circuit 30, a ⅓-frequency dividing circuit 31, a ¼-frequency dividing circuit 32, a 1/5-frequency dividing circuit 33 and a selector 34. The selector 34 selects, as the screen clock signal, either the pixel clock signal itself or one of the clock signals respectively having repeating periods of two pixel clocks, three pixel clocks, four pixel clocks and five pixel clocks generated by the frequency dividing circuits 30–33, in response to a color selection signal.

For example, there are selected, as the screen clock signals 10, the clock signal 38 of a repeating period of five pixel clocks for the yellow image data Y, the clock signal 37 of a repeating period of four pixel clocks for the magenta image data M, the clock signal 36 of a repeating period of three pixel clocks for the cyan image data C, and the clock signal 35 of a repeating period of two pixel clocks for the black image data BK.

The screen clock signals 10 of different screen lines or repeating periods thus selected for different color image data are supplied to the pattern signal generator 5, which generates, as shown in FIG. 4, a triangular wave 38 of a repeating period of five pixels for Y, a triangular wave 37 of a repeating period of four pixels for M, a triangular wave 36 of a repeating period of three pixels for C, and a triangular wave 35 of a repeating period of two pixels for BK. These signals are supplied to an input terminal of the comparator 4 and compared with the analog image signals 15 of respective colors to obtain pulse-width modulated signals of different screen lines for different colors as shown in FIG. 2.

Figure 5:
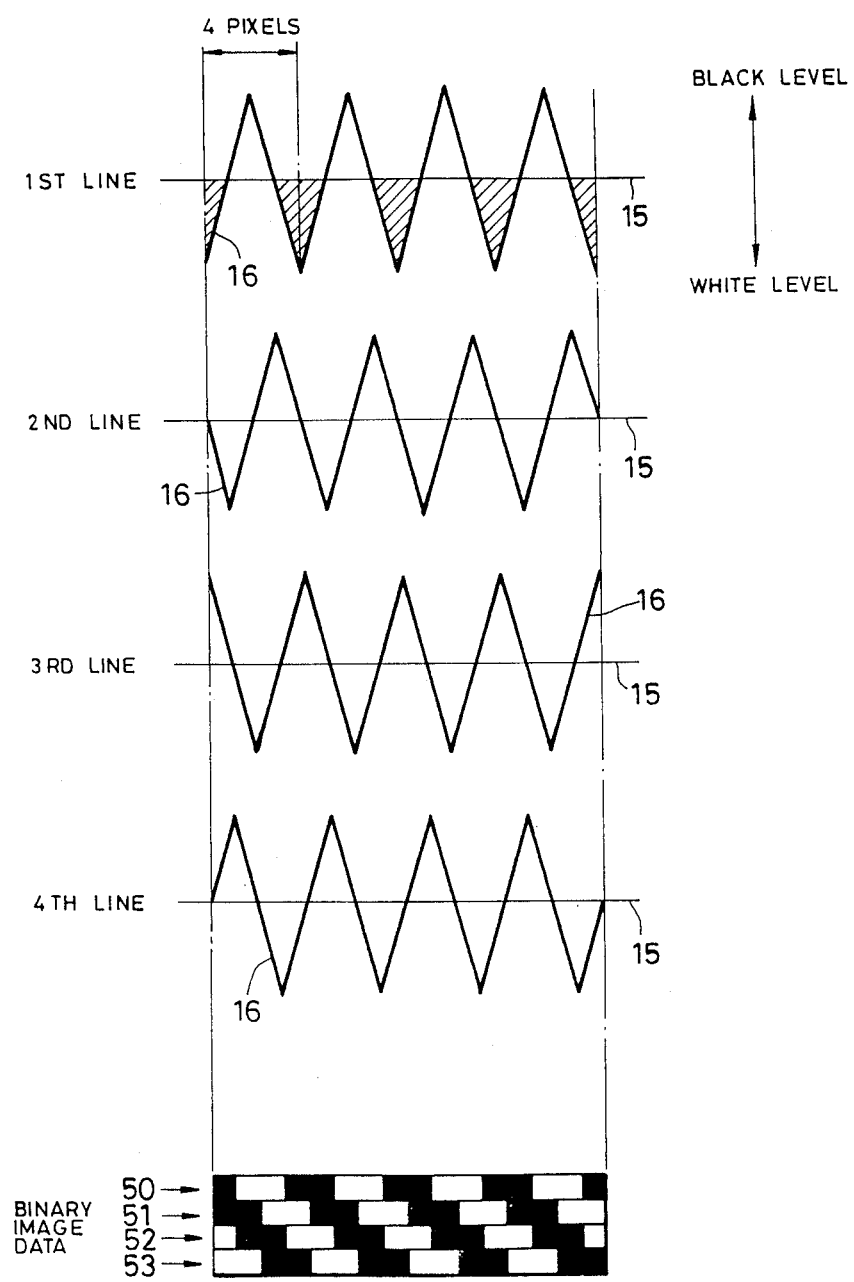
FIG. 5 is a wave form chart showing the relationship between pattern signals and binary image data.

Now reference is made to FIGS. 5 and 6 for explaining the two-dimensional arrangement of screen dots.

The angle of a screen, or the direction of two-dimensional arrangement of pseudo screen dots, is equal to 90° (vertical screen) if the delay time is not switched by the selector 13 for every sub-scanning line, but becomes to −45° if a delay of one pixel clock is provided for every line. In this manner signals of different screen lines and of different screen angles can be obtained for different colors.

In the following there will be explained a process of varying the period of two-dimensional arrangement of the pseudo screen dots for the color signals of Y, M, C and BK, namely obtaining pseudo screen dot arrangement of different screen angles for different colors.

At first let us consider a case of forming a screen angle of −45° in case the screen clock signal 10 has a repeating period corresponding to 4 pixel clocks. At first the counter counts 11 the horizontal synchronization signals 17. In this case the counter 11 is a 2-bit counter, counting the number of scanning lines, and the selector 13 selects the screen clock signals 21 according to the output of said counter 11. Delay lines 16 are connected to the selector 13, and the delay time of the screen clock signal is determined by the selection of a delay line 16. Thus the screen clock signals 21 for different scanning lines have a same repeating period but different delay times.

In case of obtaining a screen angle of −45°, the screen clock signals for the 2nd, 3rd and 4th lines are respectively delayed by one pixel clock, two pixel clocks and three pixel clocks from the screen clock signal for the first line In this manner the screen clock signals 21 of which delay time varies with a cycle of 4 lines, are supplied to the pattern signal generator 5. In response the pattern signal generator 5 supplies an input terminal of the comparator 4 with the pattern signals 16, with delay times varying at a cycle of 4 lines, as shown in FIG. 5. Let us assume that the other input terminal of the comparator 4 receives analog pixel signals 15 of a uniform level as shown in Fig. 5. Said signals are compared with the pattern signal 16 for each line to provide binary image data 50 for the 1st line, 51 for the 2nd line, 52 for the 3rd line and 53 for (the 4th line, thus forming a screen of an angle of −45°.

Figure 6A:
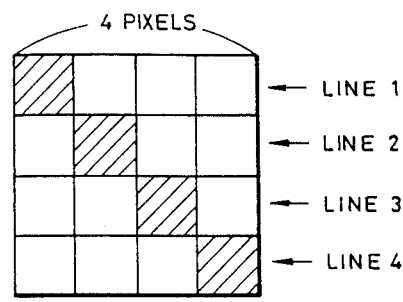
FIGS. 6A to 6D are charts showing examples of patterns of screen clock signals.

The pattern of the screen clock signals in this case is two-dimensionally represented as shown in FIG. 6A. FIG. 6A illustrates a pattern of screen angle of −45° when a repeating period of the screen clock signal corresponds to four a repeating period of pixel clocks, and the hatched squares indicate where black spots are started.

Figure 6B:
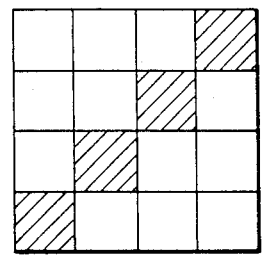
Figure 6C:
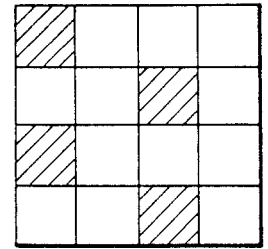
Figure 6D:
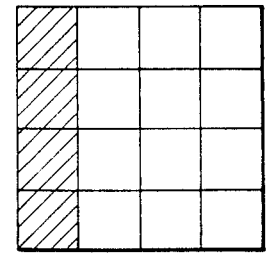

However the present embodiment does not produce digital black spots in pixel units but performs continuous pulse-width modulation for the analog pixel signal 15. FIGS. 6B, 6C and 6D respectively show patterns of screen angles of +45°, ±26.6° and +90° obtained with screen clock signals of a repeating period of 4 pixel clocks. Thus, there can be employed, as an example, the pattern of 90° in FIG. 6D for the Y signal, pattern of −45° in FIG. 6A for the M signal, pattern of +45° in FIG. 6B for the C signal, and pattern of ±26.6° for the BK signal.

The switching of screen clock pattern for different color signals can be achieved by the selector 13 in response to the color selection signal 12. In this manner the repeating period of two-dimensional arrangement of pseudo screen dots can be varied for different color signals of Y, M, C and BK.

Figure 10:
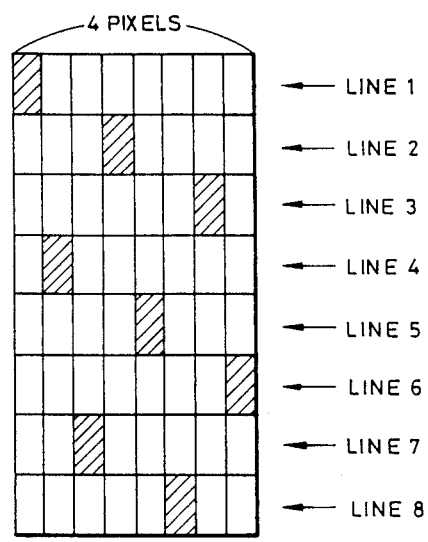
FIG. 10 is a chart showing an example of a pattern of a screen clock of another embodiment.

Now reference is made to FIG. 10 for explaining another example of screen clock pattern.

In the example shown in FIG. 6A to 6D, the delay time is regulated in the unit of a pixel clock between the scanning lines. However the delay time may also be varied for example in the unit of 0.5 pixel clocks to obtain a pattern as shown in FIG. 10.

In this pattern, the 2nd line is delayed from the 1st line by 1.5 pixel clocks. In this case, however, an 3-bit counter should be employed as the counter 11 since the repeating cycle in the sub-scanning direction is equal to 8 lines.

As explained in the foregoing, the present embodiment employs pseudo screen dot arrangements of different screen angles for the color signals Y, M, C and BK, so that four coloring materials, when superposed on paper, appear macroscopically uniform. Consequently there is reduced the unevenness in colors, resulting from fluctuations in various scanning motions of the printer, in paper feeding therein, and expansion or contraction of paper. Though high-frequency moire patterns of a small pitch are still generated, they are macroscopically averaged and not conspicuous to the human eyes.

Now reference is made to FIGS. 7A to 7C, 8A to 8C, and 9A and 9B, for explaining other examples of the screen clock pattern.

FIGS. 7A to 7C illustrate pattern obtainable with 2-pixel screen clock signals, with screen angles of −45° in FIG. 7A, +45° in FIG. 7B and 90° in FIG. 7C.

FIGS. 8A to 8C illustrate patterns obtainable with 3-pixel screen clock signals, with screen angles of −45° in FIG. 8A, +45° in FIG. 8B and 90° in FIG. 8C.

Figure 9A:
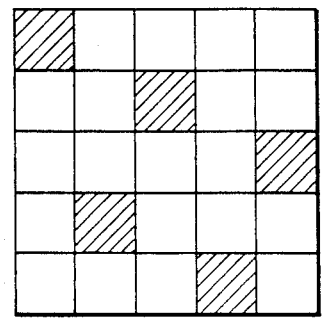
FIGS. 9A and 9B are charts showing examples of patterns of other screen clocks.
Figure 9B:
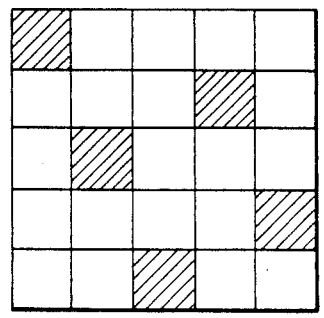

FIGS. 9A and 9B illustrate other screen angles, i.e., −26.6° in FIG. 9A and +26.6° in FIG. 9B.

In case the pixel clock signal 9 itself is employed as the screen clock signal, there can only be obtained a screen angle of 90°, or a vertical screen. The color selection signal 12 allows, by means of the selectors 34, 13, to select screens of mutually different screen lines and screen angles for different color signals. For example there can be employed a screen of −26.6° with 5-pixel clock signal as shown in FIG. 9A for the Y-signal, a screen of +45° with 4-pixel clock signal as shown in FIG. 6B for the M-signal, a screen of −45° with 3-pixel clock signal as shown in Fig. 8A for the C-signal, and a screen of 90° with 2-pixel clock signal as shown in FIG. 7C for the BK-signal.

In general the resolving power is improved for a larger number of screen lines, or a finer screen, while the tonal rendition is improved for a smaller number of screen lines, or a coarser screen. In the above-mentioned example, an emphasis is given to the resolving power for the BK-signal, while a compromise is made between the resolving power and the tonal rendition for the C- and M-signals, and a certain loss in the resolving power is considered permissible for the Y-signal because such loss is not visually conspicuous. Use of different screen lines for different colors provides one-dimensional averaging of color overlap on the paper, but the use of different screen angles for the different colors further achieves two-dimensional averaging of overlap of four coloring materials, thus further reducing the unevenness in color.

The number of screen lines can be regulated more finely by using a signal obtained by directly dividing the frequency of the reference clock signal, or even more finely by the use of plural clock generators of mutually different frequencies.

As explained in the foregoing, the present embodiment is capable of releasing the color signals of Y, M, C, BK in screens of different numbers of lines, thus varying the balance of resolving power and tonal rendition for each color, whereby there can be obtained a full-color print of a high image quality, with a high resolving power and an improved tonal rendition. Also the overlapping of four coloring materials superposed on paper is made further uniform by employing different screen angles for different color signals. Consequently it is rendered possible to reduce the unevenness in color resulting from fluctuations in various scanning motions of the printer, in paper feeding speed, or from elongation or contraction of paper. Though high-frequency moire patterns of a small pitch are still generated, they are macroscopically averaged and not conspicuous to the human eyes.

In the present embodiment a desired pattern signal can be generated with an exact timing for each scanning line, since the screen clock signal synchronized with the horizontal synchronization signal is generated by the reference clock signal 19 of a frequency higher than that of the synchronization for generating the triangular pattern signal. The pattern signal of such exact timing is utilized for substantially continuous pulse-width modulation of density information to provide a high image quality in the reproduced image.

In place of the triangular pattern signal employed in the foregoing embodiment, there can also be employed a sawtooth wave, a sinusoidal wave or a trapezoidal wave.

Figure 11:
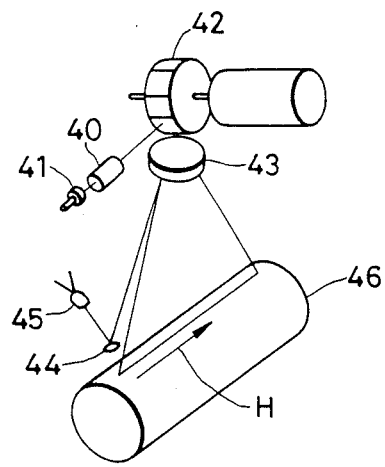
FIG. 11 is a schematic view of a scanning optical system of a laser beam printer to which the present invention is applicable.

FIG. 11 is a schematic perspective view of a scanning optical system of a laser beam printer in which the present invention is applicable, wherein provided is a semiconductor laser emitting a laser beam modulated according to the aforementioned pulse-width modulated signal. The modulated light beam from the semiconductor laser 41 is collimated by a collimating lens 40, and deflected by a rotary polygonal mirror 42 having plural reflecting facets. The deflected light beam is focused, by an f-$\theta$ imaging lens 43, onto a photosensitive drum 46 to effect beam scanning thereon. In the beam scanning operation, the light at the front end of each scanning line is reflected by a mirror 44 and guided to a beam detector 45. A beam detection (BD) signal from the detector 45 is used as the aforementioned horizontal synchronization signal in the horizontal scanning direction. In the foregoing embodiment the horizontal synchronization signal is composed of the BD signal.

The BD signal is detected for each scanning line of the laser beam and is utilized as a timing signal for supplying the pulse-width modulated signal to the semiconductor laser.

The present invention is not limited to the foregoing embodiment but may be subjected to various modifications within the scope and spirit of the appended claims.

What is claimed is:

1. An image processing apparatus for modulating a recording beam, said apparatus comprising:

image signal generating means for generating first and second image signals;

pulse-width modulated signal generating means for processing said first and second image signals, generated by said image signal generating means, respectively with first and second analog pattern signals to generate first and second pulse-width modulated signals for modulating the recording beam; and synchronization signal generating means for generating a synchronization signal, by detecting the recording beam, that indicates a scanning position of the recording beam;

wherein said first and second analog pattern signals are generated in synchronism with said synchronization signal, and have mutually different phases for obtaining mutually different screen angles in a reproduced image to be formed with said recording beam modulated by said first and second pulse-width modulated signals.

2. An image processing apparatus according to claim 1, wherein said first and second image signals are respectively associated with first and second colors.

3. An image processing apparatus according to claim 2, wherein said first and second analog pattern signals are first and second triangular signals, and said pulse-width modulated signal generating means comprises comparator means for comparing said first and second analog image signals respectively with said first and second triangular signals to generate said first and second pulse-width modulated signals.

4. An image processing apparatus for modulating a recording beam, said apparatus comprising:

image signal generating means for generating first and second image signals;

pulse-width modulated signal generating means for processing said first and second image signals, generated by said image signal generating means, respectively with first and second analog pattern signals to generate first and second pulse-width modulated signals for modulating the recording beam; and synchronization signal generating means for generating a synchronization signal, by detecting the recording beam, that indicates a scanning position of the recording beam;

wherein said first and second analog pattern signals are generated in synchronism with said synchronization signal, and have mutually different repeating periods in order to obtain mutually different numbers of lines in a reproduced image to be formed with said recording beam modulated by said first and second pulse-width modulated signals.

5. An image processing apparatus according to claim 4, wherein said first and second image signals are respectively associated with first and second colors.

6. An image processing apparatus according to claim 1, wherein said first and second analog pattern signals are first and second triangular signals of mutually different repeating periods, and said pulse-width modulated signal generating means comprises comparator means for comparing said first and second analog image signals respectively with said first and second triangular signals to generate said first and second pulse-width modulated signals.

7. An image processing apparatus for modulating a recording beam, said apparatus comprising:

image signal generating means for generating first and second color image signals;

pulse-width modulated signal generating means for processing said first and second color image signals, generated by said image signal generating means, respectively with first and second analog pattern signals to generate first and second pulse-width modulated signals for modulating the recording beam; and synchronization signal generating means for generating a synchronization signal, by detecting the recording beam, that indicates a scanning position of the recording beam;

wherein said first and second analog pattern signals are generated in synchronism with said synchronization signal.

8. An image processing apparatus according to claim 7, wherein said first and second analog pattern signal have mutually different phases in order to obtain mutually different screen angles in said reproduced image.

9. An image processing apparatus according to claim 7, wherein said first and second analog pattern signals have mutually different repeating periods in order to obtain mutually different number of lines in said reproduced image.

10. An image processing apparatus according to claim 1, further comprising reference clock signal generating means for generating a reference clock signal, and screen clock signal generating means for dividing the frequency of said reference clock signal in response to said synchronization signal to generate first and second screen clock signals to be used for generating said first and second analog pattern signals.

11. An image processing apparatus according to claim 10, further comprising image clock signal generating means for dividing the frequency of said reference clock signal in response to said synchronization signal to generate an image clock signal for transmitting said first or second image signal from said image signal generating means to said pulse-width modulated signal generating means.

12. An image processing apparatus according to claim 4, further comprising reference clock signal generating means for generating a reference clock signal, and screen clock signal generating means for dividing the frequency of said reference clock signal in response to said synchronization signal to generate first and second screen clock signals to be used for generating said first and second analog pattern signals.

13. An image processing apparatus according to claim 12, further comprising image clock signal generating means for dividing the frequency of said reference clock signal in response to said synchronization signal to generate an image clock signal for transmitting said first or second image signal from said image signal generating means to said pulse-width modulated signal generating means.

14. An image processing apparatus according to claim 7, further comprising reference clock signal generating means for generating a reference clock signal, and screen clock signal generating means for dividing the frequency of said reference clock signal in response to said synchronization signal to generate first and second screen clock signals to be used for generating said first and second analog pattern signals.

15. An image processing apparatus according to claim 14, further comprising image clock signal generating means for dividing the frequency of said reference clock signal in response to said synchronization signal to generate an image clock signal for transmitting said first or second color image signal from said image signal generating means to said pulse-width modulated signal generating means.

16. An image processing apparatus according to claim 1, wherein said first and second analog pattern signals have mutually different repeating periods for obtaining mutually different numbers of lines in said reproduced image.

17. An image processing apparatus according to claim 1, wherein said recording beam is a laser beam and further comprising image forming means for modulating said laser beam according to said first and second pulse-width modulated signals to form an image on a recording medium, said image forming means comprising said synchronization signal generating means.

18. An image processing apparatus according to claim 4, whrein said recording beam is a laser beam and further comprising image forming means for modulating said laser beam according to said first and second pulse-width modulated signals to form an image on a ercording medium, said image forming means comprising said synchronization signal generating means.

19. An image processing apparatus according to claim 7, wherein said recording beam is a laser beam and further comprising image forming means for modulating said laser beam according to asid first and second pulse-width modulated signals to form an image on a recording medium, said image forming means comprising said synchronization signal generating means.

20. An image processing apparatus according to claim 1, wherein said image signal generating means includes digital-to-analog convertor means for converting first and second digital image signals into first and second analog image signals.

21. An image processing apparatus according to claim 4, wherein said image signal generating means includes digital-to-analog convertor means for converting first and second digital image signals into first and second analog image signals.

22. An image processing apparatus according to claim 7, wherein said image signal generating means includes digital-to-analog convertor means for converting first and second color digital image signals into first and second color analog image signals and wherein said pulse-width modulated signal generating means comprises comparator means for comparing said first and second color analog image signals respectively with said first and second analog pattern signals to generate said first and second pulse-width modulated signals.

23. An image processing apparatus comprising:
image signal generating mans for generating first and second digital color image signals for each pixel of an image being processed;
digital-to-analog convertor means for converting said first and second digital color image signals into first and second analog color image signals; and
pulse-width modulated signal generating means for processing said first and second analog color image signals output from said digital-to-analog convertor means with first and second analog pattern signals to generate first and second pulse-width modulated signals;
wherein one period of each of said analog pattern signals corresponds to a respective plurality of said pixels.

24. An image processing apparatus according to claim 23, wherein said pulse-width modulated signal generating means processes said first and second analog color image signals output from said digital-to-analog converter means respectively with said first and second analog pattern signals to generate said first and second pulse-width modulated signals and wherein said first and second analog pattern signals are used for modulating a recording beam; said apparatus further comprising synchronization signal generating means for generating a synchronization signals, in response to the recording beam, that indicates a scanning position of the recording beam; and wherein said first and second analog pattern signals are generated in synchronism with said synchronization signal and have mutually different characteristics in order to obtain mutually different characteristics in a reproduced image to be formed with said beam modulated by said first and second pulse-width modulated signals.

25. An image processing apparatus according to claim 23, further comprising input means for selectively inputting said first and second digital color image signals to said digital-to-analog convertor means.

26. An image processing apparatus comprising:
supply means for sequentially supplying a color image signal for each color component of an image being processed; and
pulse-width modulated signal generating means for gradation-processing said color image signal for each color component sequentially supplied from said supply means to generate a pulse-width modulated signal for each color component in synchronization with a synchronization signal of the same type;
wherein said pulse-width modulated signal generated for each color component is used to reproduce an image on a recording medium.

27. An image processing apparatus according to claim 26, wherein said color components include yellow, magenta, cyan and black.

28. An image processing apparatus according to claim 26, wherein said supply means supplies a digital color image signal for each pixel of said image.

29. An image processing apparatus according to claim 28, further comprising digital-to-analog converting means for converting said digital color image signal into an analog color image signal, wherein, for each said color image signal, said pulse-width modulated signal generating means gradation-processes said analog color image signal using an analog pattern signal having a predetermined period to generate said pulse-width modulated signal.

30. An image processing apparatus according to claim 29, wherein one period of said analog pattern signals corresponds to a plurality of said pixels.

31. An image processing apparatus according to claim 29, wherein said pulse-width modulated signal is used to modulate a recording beam, wherein said apparatus further comprises synchronization signal generating means for generating a synchronization signal, in response to the recording beam, that indicates a scanning position of the recording beam, and said analog pattern signals are generated in synchronism with said synchronization signal.

32. An image processing apparatus for modulating a recording beam comprising:

image signal generating means for generating first and second color image signals for each pixel of an image being processed;

pulse-width modulated signal generating means for processing said first and second color image signals generated by said image signal generating means with respective first and second analog pattern signals to generate first and second pulse-width modulated signals for modulating the recording beam; and synchronization signal generating means for generating a synchronization sign la, in response to the recording beam, that indicates a scanning position of the recording beam;

wherein said analog pattern signals are generated in synchronism with said synchronization signal.

33. An image processing apparatus according to claim 32, wherein said image signal generating means generates first and second digital color image signals for each pixel, and said image processing apparatus further comprises digital-to-analog convertor means for converting said first and second digital color image signals into first and second analog color image signals, wherein one period of said analog pattern signals corresponds to a plurality of said pixels.

34. An image processing apparatus according to claim 32, further comprising reference clock signal generating means for generating a reference clock signal and screen cock signal generating means for dividing the frequency of said reference clock signal in response to said synchronization signal to generate a screen clock signal for generating said analog pattern signals.

35. An image processing apparatus according to claim 34, further comprising image clock signal generating mans for dividing the frequency of said reference clock signal in response to said synchronization signal to generate an image clock signal for transmitting said first and second digital color image signal from said image signal generating means to said pulse width modulated signal generating means.

36. An image processing apparatus according to claim 33, wherein said pulse-width modulated signal generating means comprises comparator means for comparing said first and second analog color image signals with said analog pattern signals to generate said first and second pulse-width modulated signals.

37. An image processing apparatus according to claim 33, further comprising input means for selectively inputting said first and second digital color image signals to said digital-to-analog converter means.

* * * * *

UNITED STATES PATENT AND TRADEMARK OFFICE
CERTIFICATE OF CORRECTION

PATENT NO. : 4,980,757
DATED : December 25, 1990
INVENTOR(S) : YUJI NISHIGAKI

It is certified that error appears in the above-identified patent and that said Letters Patent is hereby corrected as shown below:

On Title Page;

BEFORE [30] FOREIGN APPLICATION PRIORITY DATA

Insert:   --[63] Related U.S. Application Data
                Continuation of Ser. No. 06/897,053,
                Aug. 15, 1986, abandoned.--.

IN [56] REFERENCES CITED

U.S. PATENT DOCUMENTS, "4,295,258  1/1981  Holladay"
        should read --4,245,258  1/1981  Holladay--.

IN [57] ABSTRACT

Line 5, "pulse-with" should read --pulse-width--.
    Line 7, "pulse-with" should read --pulse-width--.
    Line 9, "synchromism" should read --synchronism--.

COLUMN 1

Line 11, "1.Field" should read --1.  Field--.
    Line 15, "2.Related" should read --2.  Related--.

COLUMN 2

Line 44, "signal 6" should read --signal 16--.
    Line 65, "pulsewidth" should read --pulse-width--.

UNITED STATES PATENT AND TRADEMARK OFFICE
CERTIFICATE OF CORRECTION

PATENT NO. : 4,980,757

DATED : December 25, 1990

INVENTOR(S) : YUJI NISHIGAKI

It is certified that error appears in the above-identified patent and that said Letters Patent is hereby corrected as shown below:

COLUMN 4

Line 25, "the counter counts 11" should read --counter 11 counts--.
    Line 51, "for (the" should read --for the--.
    Line 57, "a repeating period" should be deleted.

COLUMN 5

Line 17, "an" should read --a--.

COLUMN 7

Line 25, "2," should read --20,--.
    Line 59, "1," should read --21,--.

COLUMN 8

Line 17, "signal" should read --signals--.

COLUMN 9

Line 23, "ercording" should read --recording--.
    Line 28, "asid" should read --said--.

COLUMN 11

Line 13, "sign 1a," should read --signal,--.

UNITED STATES PATENT AND TRADEMARK OFFICE
CERTIFICATE OF CORRECTION

PATENT NO. : 4,980,757

DATED : December 25, 1990

INVENTOR(S) : YUJI NISHIGAKI

It is certified that error appears in the above-identified patent and that said Letters Patent is hereby corrected as shown below:

COLUMN 12

Line 11, "mans" should read --means--.
　　　Line 14, "signal" should read --signals--.
　　　Line 15, "pulse width" should read --pulse-width--.

Signed and Sealed this

Ninth Day of March, 1993

Attest:

STEPHEN G. KUNIN

*Attesting Officer*　　　Acting Commissioner of Patents and Trademarks